June 25, 1929.  J. REECE ET AL  1,718,580
POWER TRANSMISSION
Filed Dec. 18, 1925   3 Sheets-Sheet 1

Inventors.
John Reece
Franklin A. Reece
by Rogers, Kennedy & Campbell
Attys.

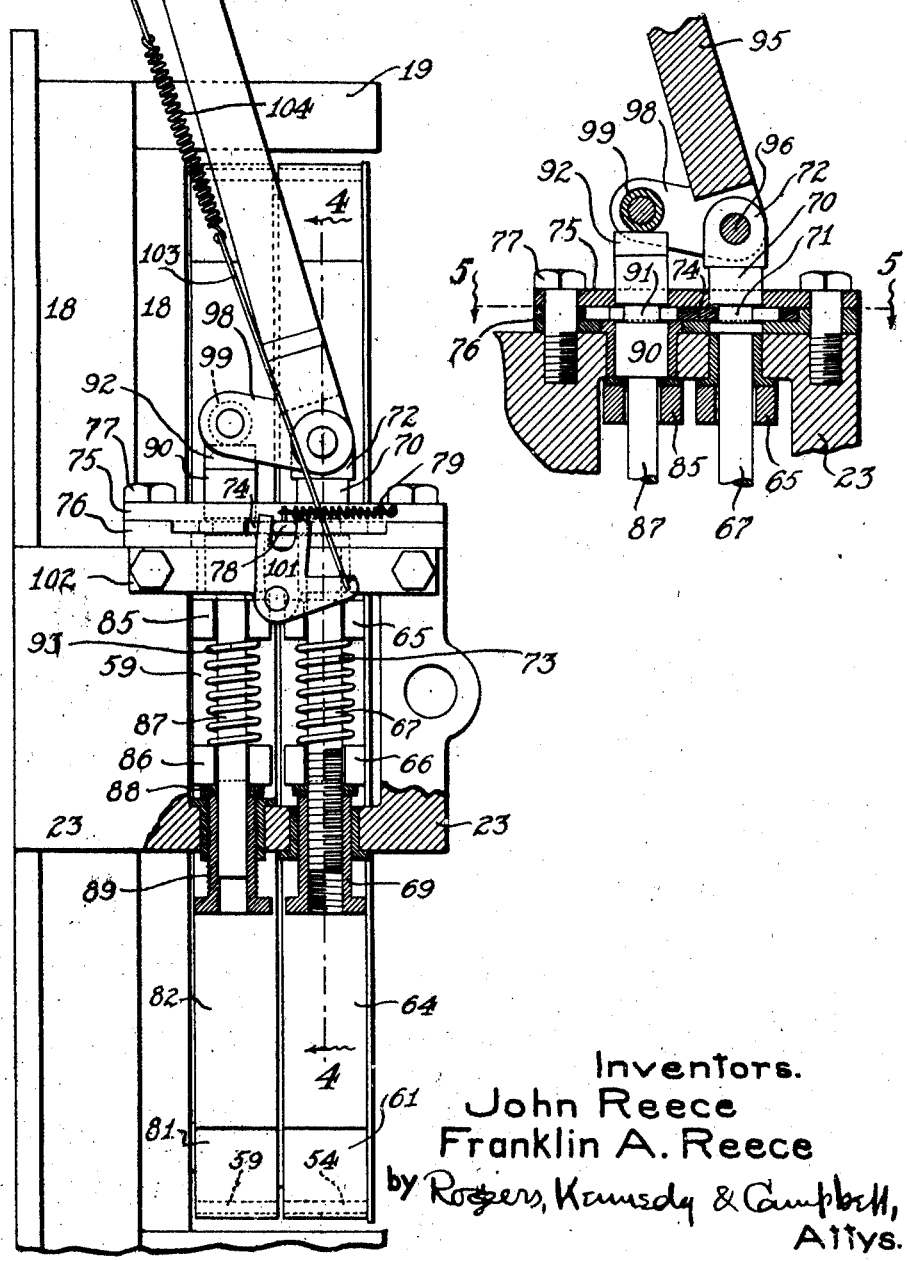

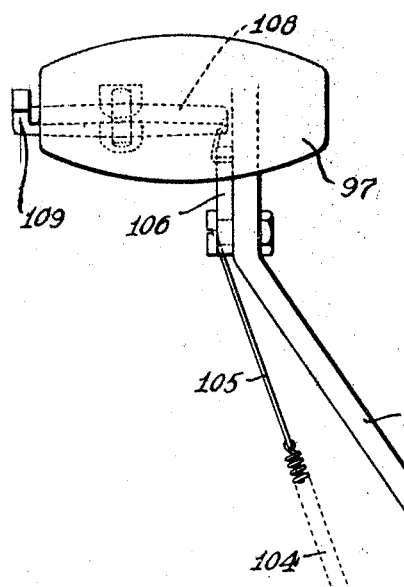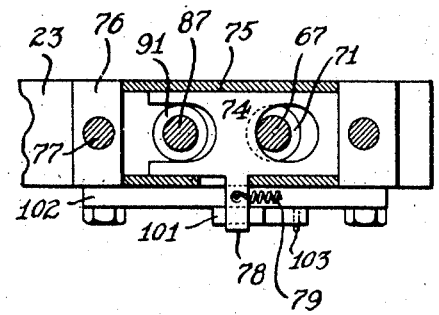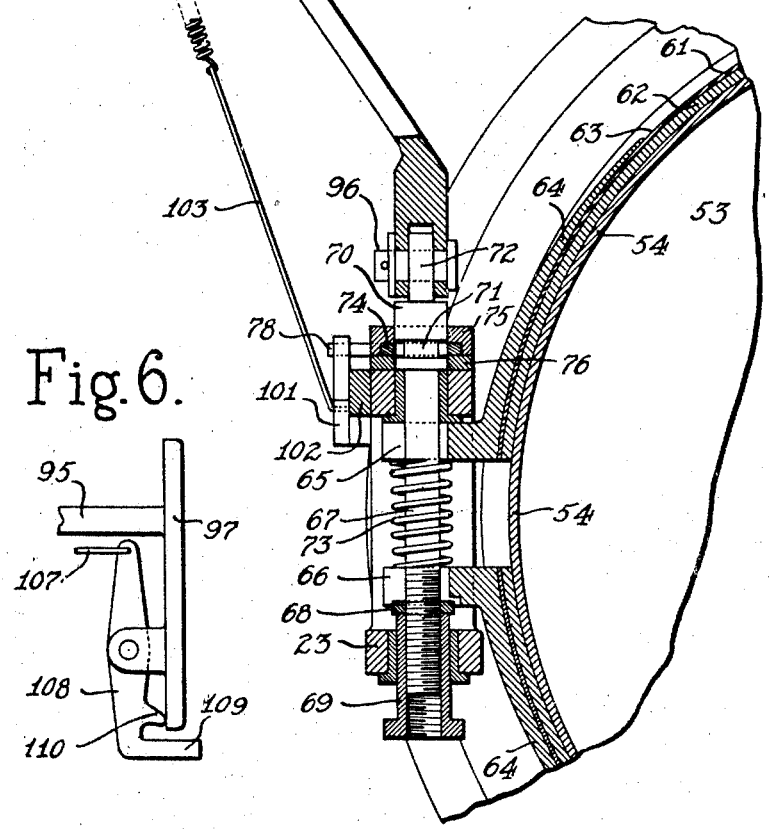

Patented June 25, 1929.

1,718,580

UNITED STATES PATENT OFFICE.

JOHN REECE, OF BOSTON, AND FRANKLIN A. REECE, OF BROOKLINE, MASSACHUSETTS, ASSIGNORS TO REECE TRANSMISSION COMPANY, OF BOSTON, MASSACHUSETTS, A CORPORATION OF MAINE.

POWER TRANSMISSION.

Application filed December 18, 1925. Serial No. 76,220.

This invention relates to power transmission and more especially to apparatus for use where varying speeds are required, for example in motor vehicles, the invention having to do especially with the control of driving or speed ratio conditions.

The general object of the invention is to afford an effective and convenient means of control or adjustment for changing the speed or driving conditions from one adjustment to another, for example from high speed to low speed, or from low speed to reverse drive. While the present invention may be used on various types of transmission it is herein shown, for purposes of illustration, applied to a transmission apparatus of the class employing one or more centrifugal masses which are carried around by the driving parts or engine shaft while subject to inward and outward or planetating motions through connections from the driven shaft in a manner to cause the centrifugal force of the masses to be transmitted as torque to the driven shaft, an instance of which class of transmission is shown in our prior Patent Number 1,551,692, issued September 1, 1925. In that prior patent is shown a self adjusting transmission of the class referred to, supplemented by reverse driving connections with a pedal for putting the latter into effect. A specific object of the present invention is to supplement such prior apparatus by providing a slow forward drive adjustment in addition to the regular forward transmission and the reverse drive. A further particular object is to provide a lever or pedal control mechanism for shifting the adjustment from normal forward drive to either slow forward drive or slow reverse drive at will. Other and further objects and advantages of the present invention will be elucidated in the hereinafter following description of an illustrative embodiment thereof, or will be apparent to those skilled in the subject. To the attainment of the objects and advantages referred to the present invention consists in the novel power transmission apparatus and the novel features of combination, arrangement, operation, mechanism and detail herein illustrated or described.

In the accompanying drawings Fig. 1 may be considered a central sectional view, looking generally from the left, of a transmission apparatus embodying the present invention, the same taken on two radii, the upper radius passing through the idler planetary gears, the lower through one of the centrifugal mass carriers. The words, left, right, rear and front will be used herein with respect to the use of the apparatus in a motor vehicle.

Fig. 2 is a left elevation of the transmission shown in Fig. 1, but with the driving parts omitted, and certain fixed parts broken away to show details of interior construction.

Fig. 3 is a sectional view taken on the line 3—3 of Fig. 4, looking from the left.

Fig. 4 is a section taken on the line 4—4 of Fig. 2, looking from the rear.

Fig. 5 is a section taken on the line 5—5 of Fig. 3, looking from above.

Fig. 6 is a detached plan view of a part of the pedal connection.

Figure 1:
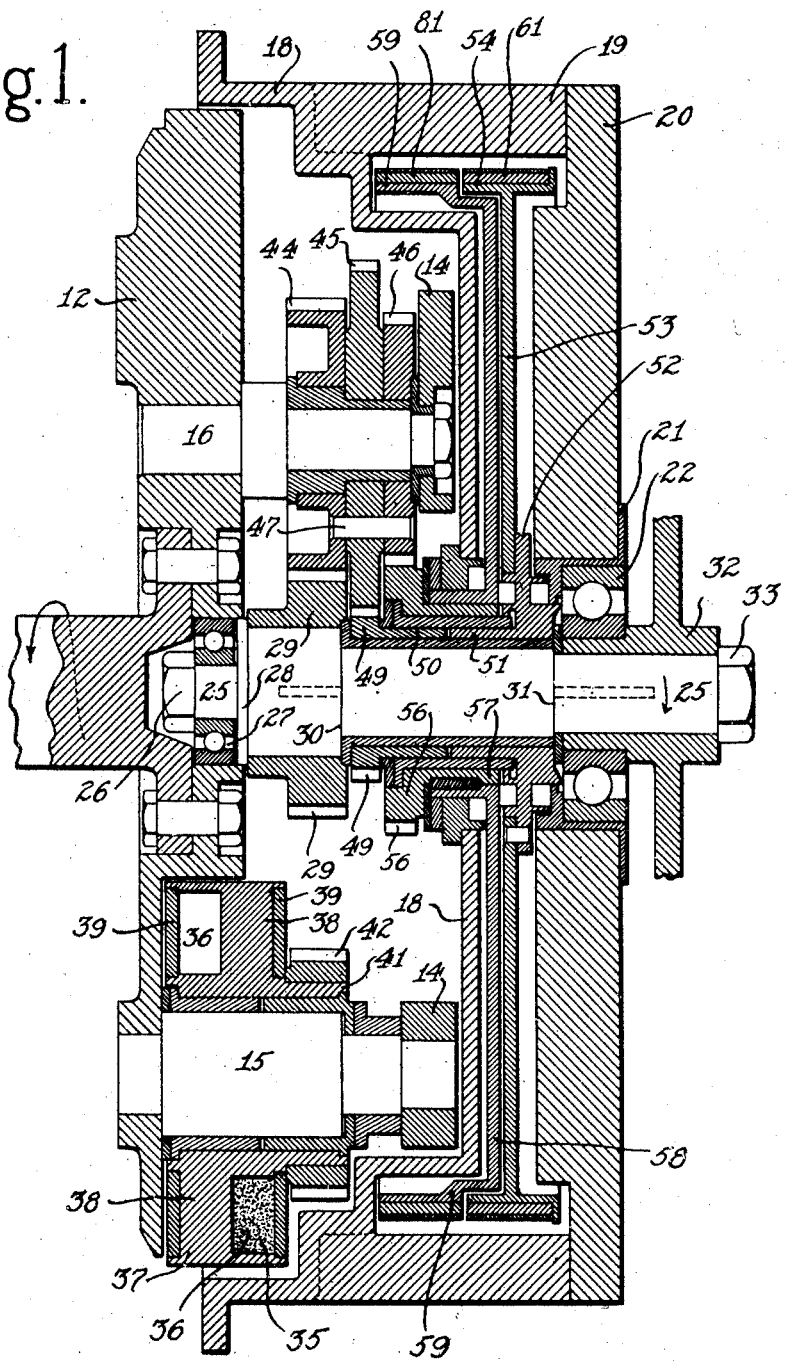

Describing first the driving parts the engine shaft 11 is shown as carrying a disk or revolving support 12 which is thereby revolved by the engine power and which causes the revolution of the centrifugal masses to be described. To the rear of and facing the revoluble support 12 is an annular disk or ring 14, this being connected to the support 12 by a number of studs 15 forming guides or bearings for the planetating masses, and a number of studs 16 giving support to the connections or planetary gears through which the masses cooperate with the driven shaft. The described elements 11 to 16 revolve rigidly together and having substantial weight and diameter they afford the fly wheel effect essential with the use of internal combustion engines.

The rotary parts may be enclosed in an outer casing or housing 18 which is shown as of stepped form, the rear side of the casing extending inwardly to the rotary parts. Extending rearwardly from the outer step of the casing are a number of integral connecting webs 19, and an annular cover plate 20 is attached to the rear ends of the webs, this plate enclosing the parts not enclosed by the housing 18. At the inner edge of the annular plate 20 is shown a double flanged sleeve member 21 within which is a ball bearing 22 between the sleeve and rotary parts to be described.

in series with one of the windings of 48ª, a resonant circuit 51ª, which shall offer a high impedance to waves of frequency $f^2$ which it is desired to particularly exclude whilst behaving as a negligible impedance for waves of frequency $f^1$. The opposite shall be done as regards the arrangement 48—50—51—52 having to transmit but waves of frequency $f^2$, i. e., all frequencies excepting $f^2$ will be highly shunted by the trap circuit 51 and then frequency $f^1$ in particular will be highly impeded by the series rejector 50 tuned to that frequency. By means of the relays 54, 55, each acting as a double pole double-throw switch, it will be possible to assign either of these coupling units to the detector 56 and the other to the transmitter 31, or conversely.

During the stand-by period, the output of detector 56 is connected to the exciting winding of a relay 40 through the primary of transformer 14ª having a trap circuit 13 across its terminals and serially through the back contacts of three other relays 41, 47 and 43. Relay 40 is shunted by a condenser 39 which by-passes the variable component of the current flowing therethrough. The secondary winding of transformer 14ª is branched to the terminals of a tuning condenser 15 in parallel with the exciting winding 58 of a tuning fork relay 57, each station having a tuning fork relay having a distinct time period of its own. When the tuning fork 57 enters into vibration it closes the circuit of battery 22 through contacts 59 and the winding of a drop relay 20, the latter being shunted by a condenser 19 which by-passes the undulatory component of the current. The parallel circuit 13 is tuned to the natural time period of the fork relay 57 at each station, and its object is to provide a shunt of negligible reactance to all modulation frequencies other than that intended to operate the fork relay 57 of the called station.

Terminals 33 of the transmitter 31 are intended to be connected to the modulating system, that is, to the keying arrangement in the case of telegraphic signalling and to the microphone system in the case of telephonic signalling, and, during the calling period only, to a source of definite low frequency, distinct for each station to be called.

In the drawing the telephone transmitter 24 may be connected thru transformer 25 and filter 26 to the back contacts of relay 30. The front contacts of relay 30 may be connected selectively to either source of low frequency 28 or 29 depending on the position of key 27. Relay 30 may be operated by depressing key 37. The low or modulating frequency source 28 or 29 may be connected according to which station it is desired to call. The armatures of relay 30 may be connected to terminals 33 of the transmitter 31 to modulate the high frequency output of transmitter 31 with the desired modulating current.

While transformer 14ª at each station will be designed so as to efficiently transform only waves of the frequency of fork 57 to which it is connected, and which corresponds to the modulation frequency for calling that station, it will be advisable, however, to avoid the fork relays of the uncalled stations being put into operation by successive transient resonance effects resulting from those components of speech modulation as may coincide with the natural time period of the various forks. With that end in view, forks having natural time periods as widely separated as possible from the focus of the speech frequency spectrum shall be chosen and then a suitable filter circuit 26 shall be used to suppress right at their origin, i. e., in the microphone system, such components of the speech as coincide with the modulation frequencies used for effecting calls, having care, however, to restrict the filter losses to the fork frequencies exclusively so as not to distort the speech by excessive curtailment of those components which determine its intelligibility.

Let us now consider a few possible conditions of operation of the system, when the detector 56 is connected say to the coupling arrangement for $f^1$, as illustrated.

(a)—One of the distant stations of the network transmits an unmodulated carrier wave of frequency $f^1$, which may be the stand-by frequency. Under those conditions, there will appear at terminals 60 from the distant station a corresponding alternating E. M. F., which will be transmitted to the input terminals of 56 through the selective coupler 48ª—50ª—51ª—53 which will give rise, in the output circuit of 56, to a direct current of constant mean value. This constant current will operate the relay 40 through the primary system of 14ª and the back contacts of relays 41, 47 and 43. It is obvious that this direct current flowing the primary system of 14ª will be without effect on its secondary. The closing of busy relay 40 will, on one hand operate the busy signal 38 and, on the other hand, will prevent all possible operation of transmitter starting relay 41 through the receiver being eventually lifted off the hook 42.

(b)—One of the stations transmits a carrier-wave of frequency $f^1$ also but modulated at a frequency other than that of the fork 57 at the station considered. The effect of this transmission on the stand-by apparatus of the receiver in question will obviously be the same as that of the preceding case, since trap circuit 13 practically short-circuits that component of the detected current which corresponds to the unresonant modulation frequency and thereby prevents it from being transferred on to fork relay 57 through transformer 14ª, fork relay 57 being, for that matter, also unresonant. While the local operator will not, under those conditions, be able to set his transmitter into operation, it may at times be desirable that he be able to listen in to a conversation offering general interest in the operation of the network. A monitoring relay 47, operated by a push-button 46 on the desk set, has therefore been provided in order to enable him to connect his receiver 11 with the output of detector 56 through transformer 12, by substituting the primary of the latter for the stand-by relay 40, transformer 14ª and trap 13, by means of one of the make contacts of relay 47 without, however, unlocking his transmitter starting equipment.

(c) One of the stations transmits a carrier wave of frequency $f^1$ modulated at the natural frequency of trap circuit 13 and hence at that of fork 57. Under those conditions, there will be obtained, at the output of detector 56, a unidirectional current the mean amplitude of which will vary at the frequency of trap circuit 13. The latter will then behave as a very high impedance for the low frequency component and will hence give rise to a large potential drop across its terminals. The primary winding of 14ª will therefore be subjected to an alternating E. M. F. corresponding to that of the modulation of the calling carrier wave. This E. M. F. will be transferred across the secondary which will in turn operate the winding 58 setting 57 into vibration.

As stated above, the vibration of fork 57 will cause the operation of the drop relay 20. The drop will in turn operate the ringing relay 43, the operation of which will, on one hand result in the closing of the circuit of bell 45 and call lamp 44, and, on the other hand connect the telephone transformer 12 to the output of detector 56 in place and instead of 14ª and 40. The switching out of the latter will prevent sustained operation of the busy lamp 38 and locking of starting relay 41. The operator at the called station considered may therefore lift the receiver off 42 and thereby close the starting relay 41 which will in turn make a contact at the starting terminals 34 of the transmitter through one of the back contacts of monitoring relay 47 and battery 22, on one hand, and, on the other hand will cause the bell 45 to cease operating by opening its circuit.

It will be understood that by placing battery 22 on the starting terminals 34, the transmitter 31 which may be an electron-discharge tube will be started. If there be any modulating potential at the terminals 33, the high frequency current generated by the transmitter will be modulated thereby.

The communication will thus be established between the called station and the station having transmitted the call. On replacing the receiver at 42 at the end of the communication, call lamp 44 and bell 45 will give the "through" signal informing the operator that he must lift the drop of relay 20 and thereby restore the stand-by connections.

It will be noted that the exciting windings of shift-over relays 54, 55, are connected in parallel with starting terminals 34 of the transmitter 31 through one of the back contacts of ringing relay 43. They will therefore be operated simultaneously with the starting equipment branched at 34 providing, however, that ringing relay 43 has not been operated just previously to the receiver being lifted off the hook. In case ringing relay 43 would not have operated previously, which would correspond to a call initiated by the local station, the shift-over relays 54, 55, would then be operated simultaneously with the starting equipment connected at 34 and transmission would then take place on frequency $f^1$ whilst receiving would automatically be carried out on frequency $f^2$. It will be understood that transmitter 31 generates both frequencies $f^1$ and $f^2$,—frequency $f^1$ being transmitted and $f^2$ being suppressed, if the arrangement 48ª—50ª—51ª—53 be connected to the transmitter; and frequency $f^2$ being transmitted and $f^1$ being suppressed, if the arrangement 48—50—51—52 be connected to the transmitter. There will thus be realized a duplex signalling system in which transmission will automatically take place on $f^1$ and reception on $f^2$ if it is the station considered which initiates a call, but in which the opposite will automatically occur if the station sets his apparatus into operation as a result of a received call.

Referring now to Fig. 2, there is shown a diagrammatic representation of another mode of carrying out the invention which comprises the use of a three-electrode tube detector for rectifying the carrier wave in place and instead of the schematic detector 56 of Figure 1 and also of a second three-electrode tube 16 for rectifying the low-frequency alternating component of the calling modulation. Tubes 3 and 16 have their filaments heated by the common source 7 through steadying or ballast resistors 5 and 18, voltmeters 4 and 17 being branched across their respective filament terminals in order to measure the voltage applied thereto. The grids of tubes 3 and 16 are connected to the slider of a potentiometer 9 respectively through the carrier-wave input circuit 1—2 and the input circuit 14—15 of the low-frequency calling device. Potentiometer 9 is branched across a battery 6 intended to suitably bias the grids with negative potential. Capacity 10, branched across the potentiometer slider and the positive terminal of battery 6 operates in by-passing oscillations around the potentiometer resistance. The output circuits of both tubes are also fed off a common source 8. The output circuit of tube 3 is connected to the various elements by means for depressing the brake rod 87 and thereby cause its head 90 to press downwardly upon the upper lug 85, and tighten the brake band 81. A spring 93, like the spring 73, surrounding the brake rod 87, presses apart the lugs 85 and 86, resisting the tightening of the band 81.

It will thus be seen that the slow forward drive brake band 61 is applied or tightened by lifting the rear brake rod 67, while the reverse brake band is applied by depressing the reverse brake rod 87. Normally both of the rods are in neutral or inoperative position as seen in Figs. 2, 3 and 4, and in that position either of them is adapted to be held inoperative by the locking slide 74, which is shown in Figs. 2, 3 and 5 as engaged with the groove of the forward drive brake rod 67.

A controller or lever 95 is shown arranged to operate at will either of the brake rods 67 and 87. The lower end of the lever 95 is bent and forked to straddle the eye 72 of the brake rod 67 and the tongue 92 of the brake rod 87. A pin 96 connects the lever to the eye 72 of rod 67. The lever 95 is shown as having a curved or bent contour extending upwardly and forwardly and then turned rearwardly to where at its extremity it is shown provided with a foot piece or pedal 97. The pedal lever 95, as already indicated, is intended to operate at will the brake rod 67, through the pin 96, or the brake rod 87, the lever having a forward extension 98 for this purpose, straddling the tongue 92, and carrying a roller 99 bearing upon the top side of the tongue. With the parts in the position shown the brake rod 67 is locked, and therefore the pedal lever will swing about the pin 96, and the roller 99 will press down on the tongue 92 and thereby depress the brake rod 87, tightening the brake band 81 and applying reverse drive. In order to give slow forward drive the locking slide 74 should be shifted to release the brake rod 67 and lock the rod 87 before the pedal lever is thrown. For the purpose of shifting the locking slide is shown a forked lever 101 pivoted upon a bar 102 bolted to the left face of the fixed extension 23. The fork of the shifting lever 101 engages the leftward extending finger 78 of the locking slide. The spring 79 holds the parts normally in the position shown. An operating rod 103 is shown for swinging the shifting lever 101 to reverse the locking slide. The rod 103 in turn is pulled by a spring 104 which should be considerably stiffer than the spring 79. An upper pull rod 105 is connected to the spring and this in turn by a bell crank 106 and pull rod 107 is connected to a tipping lever 108, shown separately in Fig. 6, the lever 108 having an outstanding toe or finger 109 arranged alongside the foot piece 97 and projecting substantially above the surface thereof, with a stop projection 110 determining the relative positions of foot piece 97 and lever 108 and thereby the projecting member 109. In driving a vehicle the foot may normally rest, as indicated in Fig. 2, flatly upon the pedal 97, alongside the projection 109. In this condition the forward brake rod 67 is locked as in Fig. 3, and if the pedal be depressed the lever 95, swinging about the fulcrum 96, will depress the brake rod 87 and apply slow reverse drive. If, however, the foot should be shifted to overlie slightly the projection 109 before the pedal is thrust, this will swing the lever 108 and through the pull rods will cause the shifting of the locking slide 74 so as to lock the brake rod 87 and free the rod 67, so that the thrusting of the pedal and swinging of the lever will in that case pull up upon the rod 67, with the roller 99 as a fulcrum, and apply slow forward drive. As stated, the reversal of the spring 79 will reverse the operation, so that the foot pressed flatly on the pedal will bring about slow forward drive, while the application of the foot to the projection 109 will first convert the mechanism for reverse drive before the pedal is thrust downwardly; in fact the pedal 97, with its converting projection 109, may be used for changing from any desired condition of drive to any other desired condition of drive.

In one aspect the illustrated apparatus may be described as comprising a transmitting means which affords different conditions of drive by adjustment, a first applier or engaging means for putting one condition of drive into effect, specifically low speed forward drive, a second applier for putting another condition into effect, specifically low speed reverse drive, a control lever or pedal having connections for applying one or the other of the appliers, and a device for rendering operative at will the connections from the lever to either of the appliers. The two appliers thus give two conditions of drive and when neither of these is in effect the apparatus normally delivers high, or full speed drive, namely in a self adjusting manner through the centrifugal mass type of transmission. The finger, shift member or projection 109 stands alongside the main pedal and is relatively movable for the purpose of shifting the applier connections. The shift member and the rods which it operates are associated with the pedal lever and preferably mounted directly on it so as to swing with the lever. The purpose of the spring 104 will be understood from the fact that this spring will stretch considerably when the pedal is thrown fully forwardly. The spring also serves the function of restoring the pedal to normal position when the foot is moved. The spring 104 is stronger than the spring 79 so that when the shift member, projection or toe 109 is depressed, this will act through the pull rods and spring 104 to stretch the spring 79 and shift the locking slide from one brake rod to the other. The element 98 may be described as a rocker, rocked by the throw of the pedal lever. It is like a floating rocker, having pivotal connection to both brake rods and therefore to both appliers or brakes. One brake rod moves upwardly to apply its brake and the other moves downwardly, so that when the rocker is rocked by the pedal this operates against both rods and tends to apply both brakes. One brake rod being locked the rocking action therefore shifts the free brake rod and applies the corresponding brake or applier.

It will thus be seen there has been described a power transmission apparatus with means for controlling the conditions of drive, accomplishing the objects and embodying the principles of the present invention. Since various matters of combination, arrangement, operation, mechanism and detail may be modified without departing from the principles of the invention it is not intended to limit the invention to such matters except to the extent specified in the appended claims.

What is claimed is:

1. Power transmission apparatus comprising transmitting means affording different conditions of drive, and normally delivering normal forward drive, a first applier for putting a different drive condition into effect, a second applier for putting another different drive condition into effect, a control pedal having connections for applying one or the other of said appliers comprising normally operative connections to the first applier and normally inoperative connections to the second applier, and a relatively movable toe piece adjacent said pedal for rendering inoperative the connections to the first applier and operative the connections to the second applier, arranged so that the foot can be pressed either upon the pedal only to apply the first applier or upon the toe piece to move it relatively and then depress the pedal to apply the second applier.

2. Power transmission apparatus comprising transmitting means affording different conditions of drive, an applier for putting one condition of drive into effect, a second applier for putting another condition into effect, a control lever with pedal, a shift finger or projection movably arranged laterally adjacent the pedal whereby the foot can be applied upon the pedal only or upon the finger and pedal, connections from the control lever to the appliers normally arranged so that the throw of the lever applies the first applier, and means operated from the finger for changing such connections so that the throw of the lever applies the second applier.

3. Power transmission apparatus as in claim 2 and wherein the means operated from the finger comprises a tipping lever on the pedal lever whereby the push of the finger is converted to a pull, pull rods pulled thereby, and a shifting device reversed by said rods.

4. Power transmission apparatus as in claim 2 and wherein the means operated from the finger comprises a tipping lever on the pedal lever whereby the push of the finger is converted to a pull, pull rods pulled thereby, and a shifting device reversed by said rods, with a yield spring associated therewith to permit yield as the pedal lever is thrown.

5. Power transmission apparatus comprising transmitting means affording different conditions of drive, an applier for putting one condition of drive into effect, a second applier for putting another condition into effect, a control lever or pedal having connections for applying one or the other of said appliers, and a device for rendering operative at will the connections from said lever to either applier; the connections from the lever comprising a floating rocker (as 98) connecting with both appliers and adapted to be rocked by the swing of said lever, and the device for rendering operative the connections to either applier being a reversible locking device for locking either applier inoperative, whereby when the lever is thrown it operates through the rocker to apply the other applier.

6. In combination, two appliers and an operating member or rod for each, one rod movable in one direction and the other in the opposite direction to apply the respective appliers, a rocker connected to both rods, a control lever to rock the rocker and a device to hold one or the other rod against movement and so free the other for movement.

7. The combination as in claim 5 and wherein is a shift member adjacent the control lever, and connections therefrom to said holding device.

In testimony whereof, we have affixed our signatures hereto.

JOHN REECE.
FRANKLIN A. REECE.